Patented Apr. 6, 1954

2,674,616

UNITED STATES PATENT OFFICE 2,674,616

PREPARATION OF PHOSPHORUS-CONTAINING AMINE SALTS

Rupert C. Morris, Berkeley, Calif., assignor to Shell Development Company, Emeryville, Calif., a corporation of Delaware No Drawing. Application August 18, 1951, Serial No. 242,575

9 Claims. (Cl. 260—461)

This invention relates to a new method for the preparation of amine salts of acids of pentavalent phosphorus.

The acids of pentavalent phosphorus include particularly the phosphoric and phosphonic acids, the term "phosphonic acid" being used herein in accordance with the usage followed by G. M. Kosolapoff in "Organo-Phosphorus Compounds," Wiley and Sons, New York, 1950.

It is known that amine salts of phosphoric and phosphonic acids can be prepared by direct neutralization of the acid with the desired amine. The method suffers from the disadvantage that many of the phosphonic acids are ordinarily or often most conveniently prepared in the form of an ester thereof, necessitating conversion of the ester to the free acid prior to preparation of the desired salt. In esters of some of the phosphonic acids, such as dialkyl trichloromethanephosphonates, acetylphosphonates, and carbalkoxyphosphonates, the carbon-to-phosphorus bond is labile and easily broken, as during hydrolysis. For example, various alkyl esters of trichloromethanephosphonic acid have been shown to yield carbon dioxide, alkyl chloride, and phosphoric acid upon attempted hydrolysis with hot aqueous hydrochloric acid. It also is known that esters of trichloromethanephosphonic acid form N-alkylamidophosphates and chloroform upon heating with amines, further evidencing the susceptibility of the carbon-to-phosphorus linkage therein.

It now has been discovered in accordance with this invention that neutral esters of acids of pentavalent phosphorus, e. g., neutral phosphates and neutral phosphonates, react upon heating with hydrohalogenides of amines to produce directly a salt of the amine with the phosphoric or phosphonic acid. The reaction leads to displacement of one or more of the esterifying radicals, i. e., the alcohol or phenol residues, as the case may be, of the ester reactant by the substituted ammonium group of the amine hydrohalogenide reactant and to liberation of organic halide as by-product, only one or more than one up to all of the esterifying radicals being displaced according to the relative amounts of the reactants used. In esters of the secondary phosphonic acids there is, of course, only one esterifying radical to be replaced. The reaction may be illustrated by the following non-limiting equations:

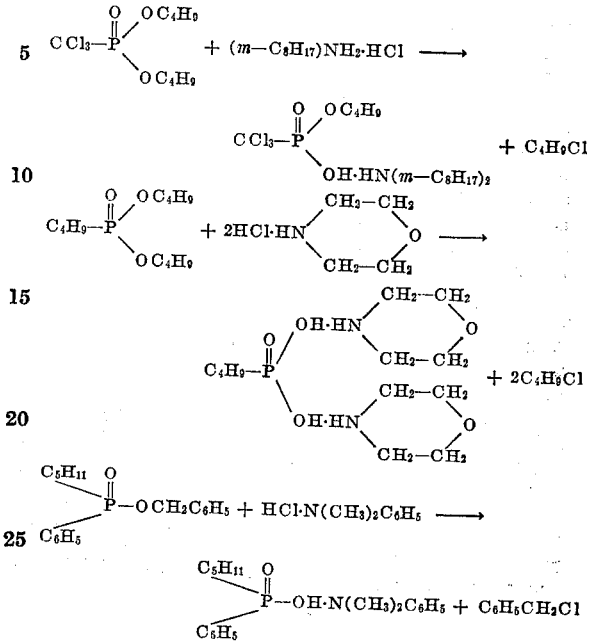

The apparently new reaction upon which the present invention is based can be brought about simply by heating a mixture of the selected phosphoric or phosphonic acid ester and the amine hydrohalogenide, temperatures of from about 50° C. to about 250° C. being generally suitable and temperatures of from about 100° C. to about 200° C. being preferred. As the reaction progresses the liberated organic halide advantageously is removed from the reaction system substantially as rapidly as formed therein. When the organic halide is volatile, as will be the case when the phosphorus-containing reactant is a lower alkyl or equivalent ester, the reaction may be carried out at the boiling point of the mixture, in the presence of an innert solvent if desired, and the evolved halide separated from the vapors by known methods, such as fractionation. In other cases the liberated halide may be continuously or intermittently separated from the reaction mixture, as by interrupting the reaction and treating the mixture with a selective solvent, or by equivalent means. The reactants preferably are employed in amounts substantially corresponding to the stoichiometric requirements, although it will be apparent that somewhat more or less of either reactant may be employed if desired. Although atmospheric pressures are usually most convenient, higher as well as lower pressures than atmospheric can be used. The amine salt produced by the reaction can be recovered and purified by conventional procedures, such as by extraction with solvents, by crystallization, etc.

The reaction and method of this invention are broadly applicable to the preparation of amine salts of phosphoric and phosphonic acids from esters of phosphoric and of phosphonic acids, respectively, and amine hydrohalogenides. The radical or radicals bonded to the phosphorus atom of the phosphonic acid ester thus can be aliphatic, cycloaliphatic or aromatic hydrocarbon groups, which may bear one or more like or dissimilar substituents, such as halogen, alkoxy, carbalkoxy, keto, etc., which substituents preferably are inert with respect to amine hydrohalogenides at the reaction temperature employed. The method of the invention is of particular value for preparing amine salts, such as aliphatic primary and aliphatic secondary amine salts, of perhaloalkane phosphonic acids, i. e., salts of alkyl primary and alkyl secondary amines and alkyl trichloromethane phosphonates, which salts are claimed in copending application Serial No. 242,574, filed August 18, 1951. As the amine hydrohalogenide there may be employed in the process of the present invention any amine hydrohalogenide, including hydrohalogenides of aliphatic, cycloaliphatic, aromatic and also heterocyclic amines, hydrohalogenides of the functionally saturated amines, i. e., saturated and/or aromatic amines coming particularly into consideration. As the hydrohalogenide there preferably is used the hydrochloride for evident reasons of availability and lower cost. Hydrobromides can also be used, hydroiodides and hydrofluorides being less desirable to employ than hydrochlorides and hydrobromides.

The following examples will illustrate the invention, it being understood that there are many other specific embodiments of the invention than those shown in the examples.

*Example I*

Dibutyl trichloromethanephosphonate and di-isopropylamine hydrochloride in equimolar amounts were heated together in a kettle equipped with a fractionating column designed to take butyl chloride overhead and to condense and return to the kettle materials boiling above butyl chloride. Butyl chloride was evolved smoothly at a kettle temperature of 185° C. to 205° C. When 0.89 mole of butyl chloride per mole of dibutyl trichloromethanephosphonate charged had been collected the heating was discontinued and the product worked up by dissolving in benzene, filtering, and evaporating off the benzene to leave a thick viscous residue which crystallized upon standing. Yield of di-isopropylammonium butyl trichloromethanephosphonate, 83% based upon the amount of butyl trichloromethanephosphonate charged.

*Example II*

Dibutyl butanephosphonate and di-isopropylamine hydrochloride were heated together in equimolar quantities as in Example I at a kettle temperature of 156° C. to 191° C., butyl chloride distilling over during the heating. When the theoretical amount of butyl chloride had been collected the product remaining in the kettle was dissolved in water, the solution was filtered and evaporated, and the residue was extracted with benzene. Evaporation of the benzene from the extract left di-isopropylammonium butyl butanephosphonate as a thick viscous oil in an amount corresponding to a yield of 90% based upon the dibutyl butanephosphonate consumed and a 51% conversion of charged dibutyl butanephosphonate to product. A sample of the product was hydrolyzed and the resulting acid identified as butanephosphonic acid by mixed melting point with an independently synthesized sample of the acid.

*Example III*

D-2-ethylhexylamine hydrochloride and dibutyl trichloromethanephosphonate in equimolar quantities were heated together as in the preceding examples, butyl chloride distilling smoothly from the mixture at kettle temperatures of 105° C. to 150° C., to yield di-2-ethylhexylammonium butyl trichloromethanephosphonate.

In a similar manner there can be prepared such neutral salts of amines and acids of pentavalent phosphorus as benzylammonium octyl cyclohexanephosphonate, triamylammonium dibenzenephosphonate, octylammonium octyl benzenephosphonate, bis(di-2-ethylhexylammonium) trichloromethanephosphonate, di-2-ethylhexylammonium butyl 2,3-dichloropropane-1-phosphonate, di-isopropylammonium dibutyl phosphate and piperidinium dioctyl phosphate. By reference to neutral salts of acids of pentavalent phosphorus it is meant that the acidic groups of the acid are present in combined form, i. e., one of the acidic groups of the acid is combined with the amine and the remaining acidic groups (if any) of the acid are combined either with the amine or in ester linkages. The salts which can be prepared by the method of this invention have varied uses, e. g., as additives to lubricating oils, including both petroleum-base and synthetic oils, as surface-active agents, as insecticides and in other biological applications, as flame-proofing materials, etc.

I claim as my invention:

1. The method of preparing a neutral amine salt of an acid of pentavalent phosphorus which comprises heating together at a temperature of from about 50° C to about 250° C. a monoamine hydrohalogenide with a neutral ester of said acid to displace at least one esterifying radical of said ester by the ammonium group of the monoamine hydrohalogenide and to simultaneously liberate organic halide containing in combination said displaced esterifying radical and halogen of the monoamine hydrohalogenide.

2. The method of preparing an aliphatic amine salt of an alkyl trichloromethanephosphonic acid, said salt containing from one to two amine salt groups, which comprises heating together at a temperature of from about 50° C. to about 250° C. an aliphatic monoamine hydrohalogenide and a dialkyl trichloromethanephosphonate and removing alkyl halide from the reaction mixture substantially as rapidly as formed therein.

3. The method of preparing a salt of a secondary aliphatic amine with a lower alkyl trichloromethanephosphonic acid, said salt containing from one to two amine salt groups, which comprises heating a mixture of an aliphatic secondary monoamine hydrochloride and a lower dialkyl trichloromethanephosphonate at a temperature of from about 100° C. to about 200° C. and distilling lower alkyl chloride from the mixture substantially as rapidly as formed therein.

4. The method of preparing a neutral amine salt of a phosphonic acid which comprises heating together a monoamine hydrohalogenide and a neutral ester of said phosphonic acid at a temperature of from about 50° C. to about 250° C. and removing liberated organic halide from the mixture substantially as rapidly as formed therein.

5. In the synthesis of an alkylammonium alkyl trichloromethanephosphonate the reaction of an alkylmonoamine hydrohalogenide with a dialkyl trichloromethanephosphonate at a temperature of from about 50° C. to about 250° C. to produce said alkylammonium alkyl trichloromethanephosphonate and alkyl halide.

6. The method of preparing an amine salt of an acid of pentavalent phosphorus which comprises heating together at a temperature of from about 50° C. to about 250° C. a monoamine hydrohalogenide and an alkyl ester of said acid of pentavalent phosphorus and removing liberated alkyl halide from the reaction mixture substantially as rapidly as formed therein.

7. The method of preparing an amine salt of an alkanephosphonic acid which comprises heating at boiling a mixture of a monoamine hydrohalogenide and a lower alkyl ester of said alkanephosphonic acid, fractionating and removing lower alkyl halide from the evolved vapors, and condensing and returning to the reaction mixture the condensate less the removed lower alkyl halide.

8. The method of preparing di-isopropylammonium butyl butanephosphonate which comprises heating a mixture of about equimolar quantities of di-isopropylamine hydrochloride and dibutyl butanephosphonate at boiling and distilling butyl chloride from the mixture substantially as rapidly as formed therein.

9. The method of preparing di-2-ethylhexylammonium butyl trichloromethanephosphonate which comprises heating a mixture of about equimolar quantities of dibutyl trichloromethanephosphonate and di-2-ethylhexylamine hydrochloride at boiling and distilling butyl chloride from the mixture substantially as rapidly as formed therein.

References Cited in the file of this patent
UNITED STATES PATENTS

| Number | Name | Date |
|---|---|---|
| 2,347,633 | Kosolapoff | Apr. 25, 1944 |